(12) United States Patent
Stocchi

(10) Patent No.: US 6,810,926 B2
(45) Date of Patent: Nov. 2, 2004

(54) MACHINE FOR TREATING CONTAINERS COMPRISING A SANDWICH STRUCTURED TABLE AND METHOD FOR MAKING SUCH A TABLE

(75) Inventor: Gabriele Stocchi, Le Havre Cedex (FR)

(73) Assignee: Sidel, Le Havre Cedex (FR)

(*) Notice: Subject to any disclaimer, the term of this patent is extended or adjusted under 35 U.S.C. 154(b) by 0 days.

(21) Appl. No.: 10/182,673

(22) PCT Filed: Jan. 23, 2001

(86) PCT No.: PCT/FR01/00208

§ 371 (c)(1),
(2), (4) Date: Sep. 11, 2002

(87) PCT Pub. No.: WO01/59354

PCT Pub. Date: Aug. 16, 2001

(65) Prior Publication Data

US 2003/0075547 A1 Apr. 24, 2003

(30) Foreign Application Priority Data

Feb. 9, 2000 (FR) .............................. 00 01568

(51) Int. Cl.$^7$ .................................................. B65B 1/04
(52) U.S. Cl. ...................................................... 141/144
(58) Field of Search ......................... 141/129, 144–152, 141/2, 18

(56) References Cited

U.S. PATENT DOCUMENTS

| | | | | |
|---|---|---|---|---|
| 3,825,043 A | * | 7/1974 | Fechheimer | 141/147 |
| 3,885,296 A | * | 5/1975 | Stout | 29/433 |
| 4,522,238 A | * | 6/1985 | Minard | 141/142 |
| 5,057,256 A | * | 10/1991 | Gorin | 264/113 |
| 5,396,936 A | * | 3/1995 | Nalbach et al. | 141/144 |

FOREIGN PATENT DOCUMENTS

| | | |
|---|---|---|
| DE | 198 01 882 A | 7/1999 |
| EP | 0 484 798 A | 5/1992 |
| EP | 0 901 974 A | 3/1999 |
| GB | 2 147 026 A | 5/1985 |
| GB | 2 300 616 A | 11/1996 |

* cited by examiner

Primary Examiner—Steven O. Douglas
(74) Attorney, Agent, or Firm—Sughrue Mion, PLLC

(57) ABSTRACT

A machine for treating containers, in particular for a bottling line, including at least a table (10) whereon are mounted functional elements (12, 14) adapted in particular to transfer and/or to process the containers. The table is produced in the form of a sandwich structure including an outer casing (18, 20) and an inner core (17) made of a material injected in fluid form into casing (18, 22) solidified therein.

14 Claims, 3 Drawing Sheets

MACHINE FOR TREATING CONTAINERS COMPRISING A SANDWICH STRUCTURED TABLE AND METHOD FOR MAKING SUCH A TABLE

BACKGROUND OF THE INVENTION

The invention concerns the field of machines for processing containers, particularly machines of the type found on a bottling line. It can therefore include rinsing machines, filling machines, corking or capping machines, or labeling machines.

These machines generally comprise a table having legs that rest on the floor. Attached to the table are functional elements such as container transfer wheels or devices for processing bottles. As the term is used in the patent, a processing device is the component that performs the principal operation for which the machine in question is intended. Thus, in a rotary filling machine, this processing device will be a carrousel on which are mounted filling spouts. In a rinsing machine, this can be the carrousel that loads the containers and carries the rinse nozzles.

Very frequently these functional elements include a rotary carrousel. By following the layout of various successive functional elements, the containers go along a path of a succession of arcs of circles that are tangentially connected to each other. In all cases, in order to ensure proper operation of the machine, the functional elements must be mounted on the table in such a way as to have a precisely defined layout.

Beneath the table there are generally accessories such as transmission mechanisms that drive the functional elements, but also pumps or piping to carry cleaning products or to remove excess product spilled on the table.

The purpose of the machine's table, therefore, is to be equipped with the different functional elements. It must be very rigid, especially so since it generally rests on a limited number of legs in order to allow free space beneath the table for the installation of a maximum number of accessories.

Moreover, particularly in food-related applications, the table must be able to resist oxidation because the products used for cleaning the machine are usually very corrosive.

According to the prior art, the tables of such machines are in the form of a lattice structure generally made of pipes or ordinary steel beams and covered with stainless steel sheet. With this type of design, the trellis structure generally has to be relatively dense, which means both that a large number of pipes must be used, as well as a relatively long assembly time, for example by welding. In addition, the assembly of the pipes must be done quite precisely or the table will be "wobbly." All of this results in a high production cost. Moreover, although the stainless steel sheet covering does indeed protect the lattice structure from a large portion of the sprays of corrosive products, nevertheless there are indirect sprays that can reach the ordinary steel structure, and in any event it is often in an atmosphere that is favorable to corrosion phenomena (temperature, moisture, etc.). The result is often that, after a number of times of operation, the structure is attacked by corrosion, which Is never satisfactory.

Another solution already proposed is to cast a one-piece table from stainless material. This solution is satisfactory in terms of rigidity and resistance to corrosion, but it involves the use of a large quantity of stainless material, which is disadvantageous in terms of weight and even more so in terms of cost.

There is therefore a need for a new design of a table for a bottle processing machine that is of simple, inexpensive construction, but which meets all of the requirements such as rigidity and resistance to corrosion.

SUMMARY OF THE INVENTION

To that end, the invention proposes a container processing machine, particularly for a bottling line, of the type having at least one table on which are mounted functional elements suitable for transferring and/or processing the containers, characterized in that the table is made in the form of a sandwich-like structure having an outer casing and an inner core composed of a material that is injected in fluid form into the casing and which solidifies therein.

According to other characteristics of the invention:
  the functional elements are mounted on the table by means of interface parts that are anchored in the inner core of the sandwich structure;
  the inner core is composed of a concrete type material;
  the inner core is composed of a synthetic resin;
  the casing is made of stainless steel;
  the casing is made in the form of bent and welded sheet metal;
  the casing has an upper face formed from sheet metal elements that are appreciably flat but arranged in such a way that the upper face of the casing is convex to promote the runoff of liquids to the outer part of the table;
  the functional elements include a container transfer wheel;
  the functional elements include a container filling carrousel;
  the functional elements include a container corking carrousel;
  the functional elements include a container cleaning carrousel;
  the functional elements include legs to support the table; and
  the table of the machine is formed from several juxtaposed table elements.

The invention also proposes a method of producing a table for a container processing machine having the above-mentioned characteristics, characterized in that it has steps consisting of:
  arranging the interface parts on a production template to fix them in place in their relative positions;
  attaching the casing to said interface parts;
  filling the casing with the material intended to form the core of the sandwich structure.

BRIEF DESCRIPTION OF THE DRAWINGS

Other characteristics and advantages of the invention will appear from the detailed description that follows, as well as from the attached drawings in which.

DETAILED DESCRIPTION OF THE INVENTION

Figure 1:
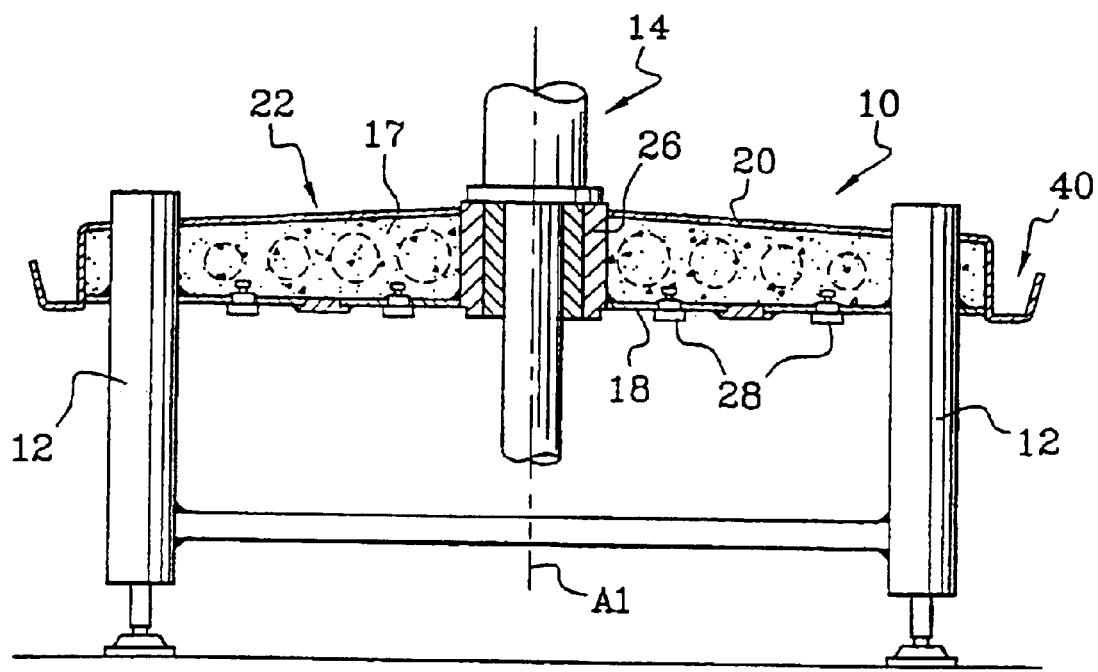
FIG. 1 is a diagrammatical cross section view illustrating a part of a machine equipped with a table according to the invention.

Illustrated in FIG. 1 is a table 10 comprising part of a container processing machine. For example, this can be a rinsing machine, filling machine, corking machine, capping machine, etc.

This table is appreciably in the form of a platform that rests on the floor on a series of legs 12 and which has a certain number of functional elements, for example a carrousel 14 mounted in rotation around its axis A1 on the table 12 [sic]. This carrousel is intended, for example, to receive the containers in order for the processing to be performed on them for which the machine or the machine element in question is designed.

In FIG. 1, only two legs 12 and part of a carrousel 14 are illustrated, but a table of this type can have other functional elements.

Figure 2:
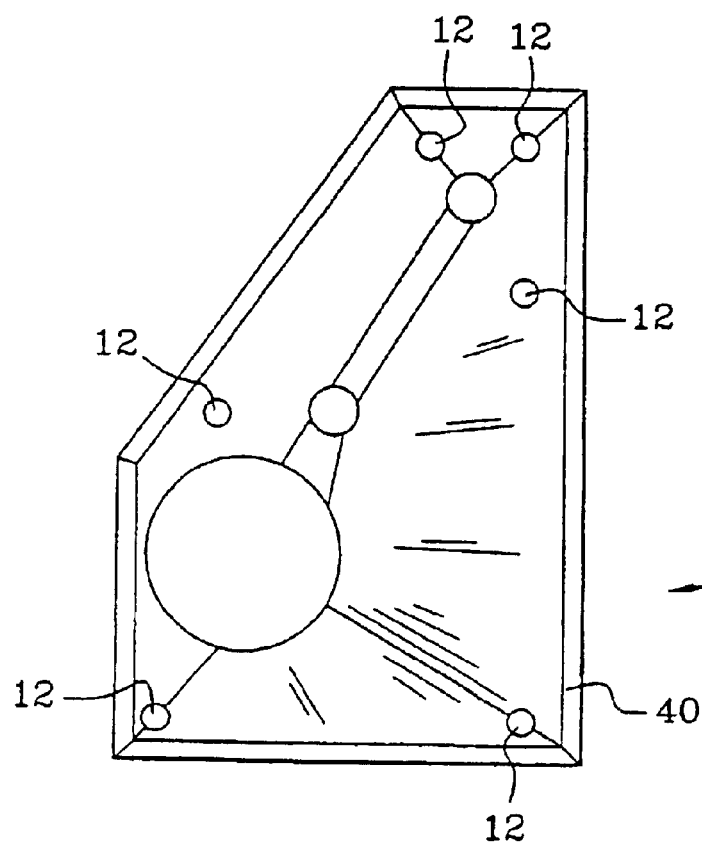
FIG. 2 is a top view of a table according to the invention, intended to be juxtaposed with other tables to form a machine.

Thus, the top view of FIG. 2 illustrates a table with a polygonal contour that can, for example, receive a container capping carrousel and two container transfer wheels, with the table resting on a series of legs 12 placed at each of the angles.

According to the invention, the table 10 is made in the form of a sandwich-like structure.

In principle, a sandwich structure has an inner core that is enclosed by at least two outer skin elements appreciably in the form of parallel plates. The main advantage of sandwich structures is in the extremely favorable relationship between their rigidity and their weight. In the case of a platform-shaped sandwich structure, it is the inner core that gives the platform most of its volume, but the outer skin elements provide most of its rigidity. To form the outer skin, an extremely rigid material is generally used, even though it is relatively dense and/or expensive. On the contrary, the use of a less dense and/or less expensive material, at least in comparison with the material comprising the skin, is favored for the core. However, this material should have good compressive strength properties. Indeed, the main role of the inner core of a sandwich structure is to prevent the two parallel skin elements from becoming deformed too much in the direction of their thickness by approaching each other. To be sure, if the two skin elements approach each other, even locally, the overall thickness of the structure decreases. The resistance to deflection of such a structure is a function of the section modulus, the value of which, for a given material, varies with the cube of the thickness. Also, if the thickness of the structure decreases locally because of bending strain, its resistance to deflection will decrease in much higher proportion and the structure will sag under the strain.

In the proposed form of embodiment, it was decided to form the sandwich structure as a casing, the two outer skins of which are connected to each other by stiffener braces 16 made from the same material as the skin, in order to increase the intrinsic rigidity of the structure. Moreover, the casing structure has the advantage that, once the casing is completed, it delimits an appreciably closed volume in which the core 17 can be injected in fluid form, as in a mold. The material of which the core is composed solidifies inside the casing being molded perfectly to the shape of the casing, which ensures a good cohesion of the sandwich structure.

The material used to make the casing is, preferably stainless steel. Advantageously, it is essentially composed of an appreciably flat lower plate 18 and a series of upper plates 20 that are bent and assembled to each other to form a convex top 22. The purpose of the convex form of the top is to prevent any stagnation of liquid on the upper face of the table. Any liquid spilled on the table therefore tends to drain off toward its outer part. Moreover, the convex character of the top 22 makes it possible to benefit from an arch effect with respect to the weight of the functional elements that are supported by the table, which is favorable to its overall rigidity.

The convex top 22 can also be made from a single piece by forming or molding, but the use of metal sheets that are bent and welded makes it possible to decrease the production cost, while still preserving a great degree of freedom with respect to the possibility of adapting the shape of the table exactly to its layout. Indeed, such a solution does not require an expensive mold to be constructed first.

For the material comprising the core 17, a material is chosen that is initially in fluid form and can therefore be poured into the casing after it has been assembled. This material must be fluid enough to fill all of the casing's internal space. Evidently, this material must then be solidified in order to have good compressive strength.

Other parameters to take into account in selecting the material for the core are, as mentioned above, its density and cost.

In the proposed example, the material comprising the core is concrete. There are different types of ready-to-use preparations on the market to produce concretes having various characteristics, but all having the common characteristics of great ease of use and high compressive strength. These concretes generally have a density of less than 2.5, which is far less than the density of steel (generally between 7 and 8). By way of example, a special concrete can be used that is marketed under the brand "LECAMIX FORTE" by LATERITE s.p.a., Milan, Italy. This type of concrete has a density on the order of 1, that is, nearly one-eighth that of the steel used to form the casing.

It would also be possible to use a heat setting synthetic resin, or even a relatively dense heat setting foam. However, the cost of such a solution proves to be greater than that of the steel used to form the casing.

According to one characteristic of the invention, the concrete is injected into the casing after it has been constructed. It is therefore preferable for the casing to be appreciably watertight.

Figure 3:
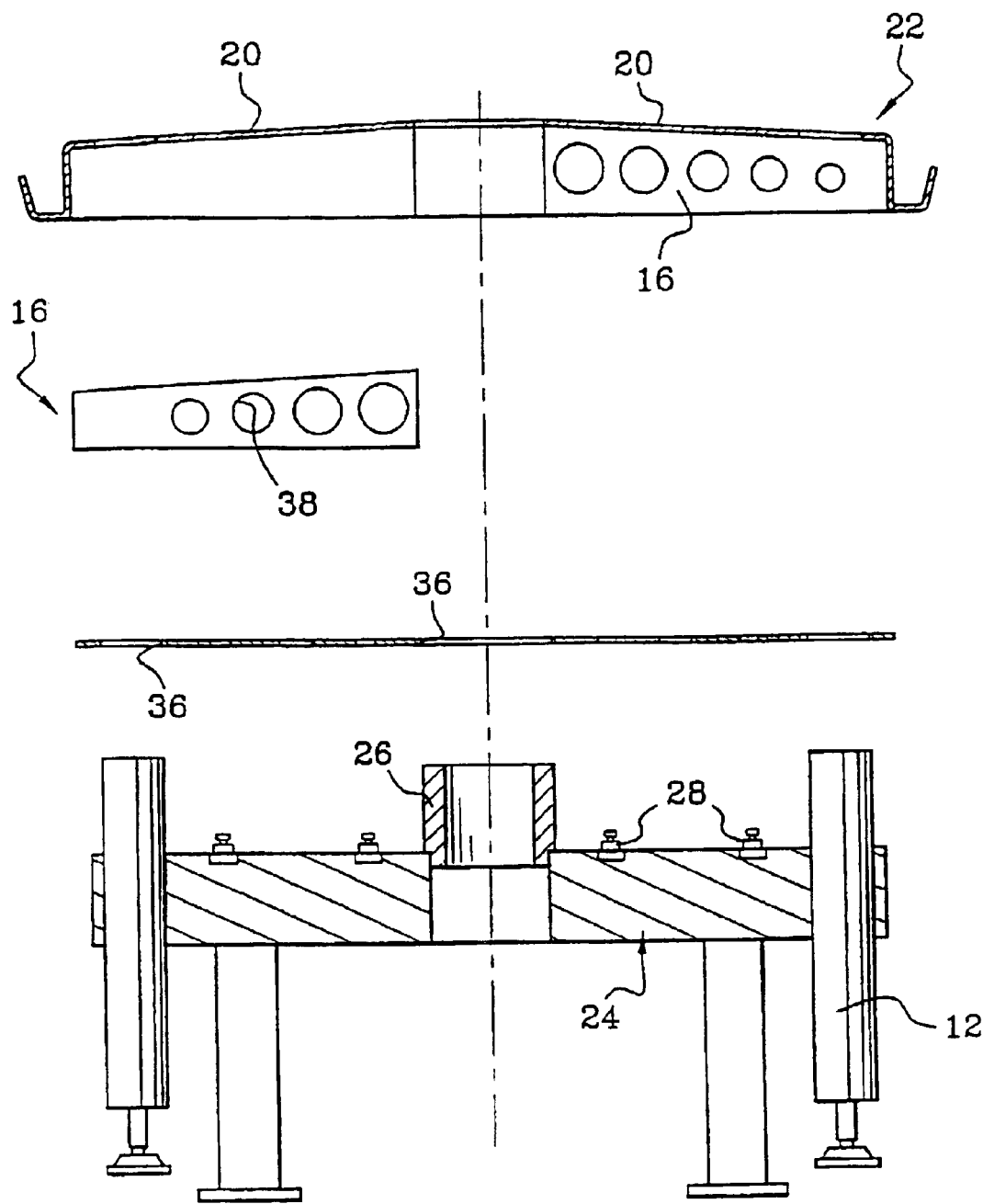
FIGS. 3 to 5 are diagrammatical views illustrating different steps in a preferred method of producing a table according to the invention.
Figure 4:
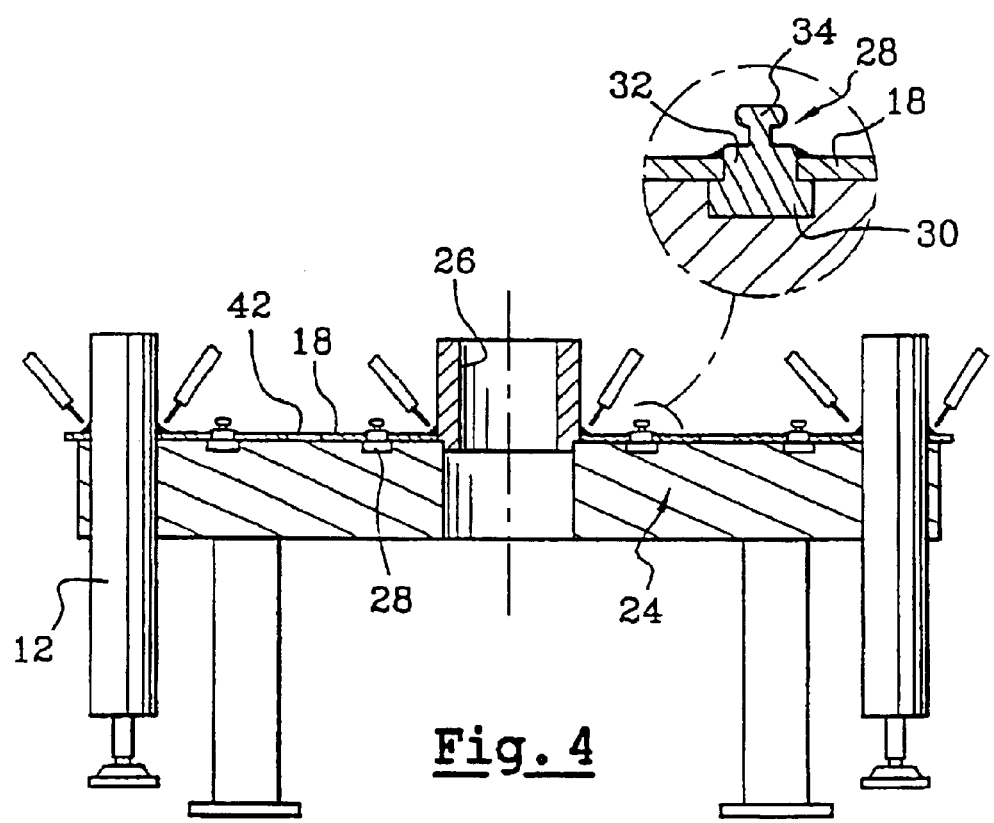
Figure 5:
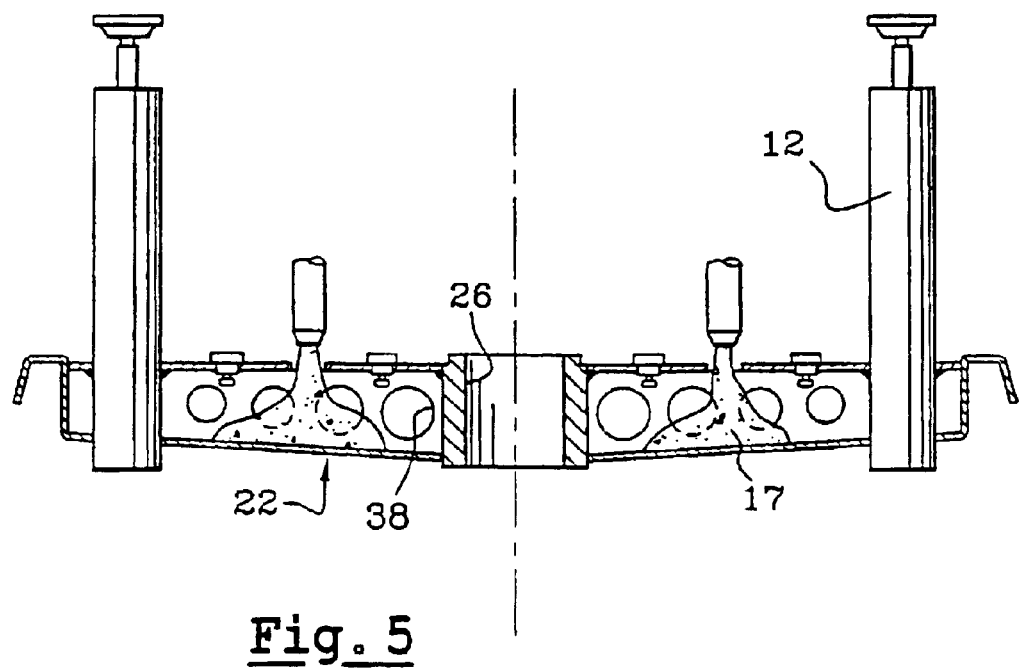

A particularly advantageous method of constructing a table according to the invention is illustrated in FIGS. 3 to 5.

As can be seen in FIG. 3, this method involves the use of a template 24. The purpose of this template 24 is to ensure the absolute pre-positioning of the different interface parts around which the casing will be constructed. These interface parts will then allow the different functional elements to be attached to the table.

In the example illustrated, the template 24 has locations at which the legs 12 are positioned and an interface shaft 26 intended for the mounting of the carrousel 14.

It also has locations for interface pins 28. Each of the pins 28 has a base 30 that is intended to extend outside the casing, in order to form, for example, an attachment point for various accessories of the machine, a body 32 intended to extend through an orifice made for that purpose in the lower plate 18 of the casing, and a head 34 that has undercut surfaces to secure the pin 28 in the concrete.

Once arranged in their respective locations, the legs 12 and the various interface parts such as the shaft 26 and the pins 28 have positions that are predefined with respect to each other. Of course, the template 24 can have other locations for other interface parts if the table has to be equipped with other functional elements. This arrangement is set, and should make it possible to ensure as precise a positioning as possible of the different functional elements with respect to each other, once they are mounted onto the interface parts.

In a next step, the lower plate 18 is placed in position on the pre-positioned elements. The plate 18 is, for example, provided with suitable orifices 36 to enable it to be put in position. Next, as can be seen in FIG. 4, the plate 18 is attached to the different elements that had previously been positioned on the template 24, for example by welding. During this operation, these elements, i.e., in particular the legs and the interface parts, remain in their respective locations to preserve their precise geometric positioning.

Once the lower plate 18 has the various pre-positioned elements attached, the other parts of the casing are assembled, i.e., in particular the braces 16 and the plates 20 that form the top 22. It will be noted that the braces 16 can also be formed from parts folded down from one of the plates 20, as well as by independent parts. Preferably, these braces 16 are plate elements that are arranged in planes perpendicular to the general plane of the table 10. It is also preferable that these braces be provided with openings 38 to avoid the formation of sealed compartments inside the casing.

When the casing has been thus assembled, the concrete (or heat setting resin) can be poured into it, making sure to fill completely the interior of the casing. As illustrated in FIG. 5, it can be preferable to perform this operation by turning the table over, because of the convex nature of the top 22 of the casing. In the example, it can be seen that the lower plate 18 has injection holes 42 for this purpose, which can be plugged after the concrete injection operation. Preferably, a concrete will be used that has as little shrinkage as possible during setting, or even a concrete that has a slight expansion.

Once the core has solidified, the table has very great rigidity as well as being relatively thin. This thinness leaves a large, useful space beneath the table 10, in which can be housed various devices or accessories that participate in the operation of the machine. Unlike a table having a lattice structure, under a table with a sandwich structure it will be particularly easy to install transmission belts used to drive certain functional elements in rotation.

Furthermore, it will be noted that the braces with holes 16 allow the convex top to be perfectly secured to the inner core 17.

Moreover, the table 10 then forms a compact assembly, perfectly cleanable and stainless.

In the old methods, the various functional elements, or the interface parts with which they are equipped, are each individually positioned with reference to the table. However, this can lead to geometric imperfections inherent in any manufacturing of large size parts. On the contrary, in the manufacturing method according to the invention, they are positioned with respect to an "exact" same reference. Because the template 24 is reused in the manufacture of all identical tables, and even for several types of similar tables, it can be manufactured with great care. The result is that the functional elements of the machine, i.e., particularly those that are used for processing containers or for the positioning of the machine with respect to adjacent machines, have a perfectly defined geometric position, regardless of the precision of construction of the casing. This explains why the latter can be constructed without excessive care by assembling bent and welded metal sheets.

It will also be noted that at least a part of the welded metal sheets that form the convex top 22 has a part that is bent appreciably into a U-shape, in order to form, all around the table, a gutter 40 to recover any liquid spilled on the top 22.

Of course, the form of embodiment that is diagrammatically illustrated in the figures is only one of the possible forms of embodiment of the invention. The invention, which in particular is to use a sandwich structure to construct the main body of the table 10, can be implemented with variations.

Thus, for example, the legs 12 can be produced at least in part according to the same principle of a casing filled with a core to obtain great rigidity. These legs can possibly take the form of extensions of the principal casing of the table so that the concrete is injected into the legs at the same time as in the table.

The other principal characteristic of the invention is in the method of production according to which the casing is, as it were, formed around the interface parts that are intended to be equipped with the functional elements, which allows relatively broad tolerances for the table while ensuring that these functional elements are perfectly attached to this table. In the example illustrated, it can be seen that the anchor pins 28 as well as the shaft 26 or the legs 12 are perfectly secured not only to the casing, but also to the inner core 17 because they are all partially embedded therein. This is also a factor in improving the rigidity of the assembly of the table 10.

What is claimed is:

1. Container processing machine having at least one table (10) on which are mounted functional elements (12, 14) for transferring and/or processing the containers, wherein the table (10) is made in the form of a sandwich-like structure having an outer casing (18, 22) and an inner core (17) composed of a material that is injected in fluid form into the casing (18, 22) and which solidifies therein.

2. Processing machine according to claim 1, wherein the functional elements (14) are mounted on the table by means of interface parts (26, 28) that are anchored in the inner core of the sandwich structure.

3. Processing machine according to claim 1, wherein the inner core (17) is composed of a concrete type material.

4. Processing machine according to claim 1 wherein the inner core (17) is composed of a synthetic resin.

5. Processing machine according to claim 1, wherein the casing is made of stainless steel.

6. Processing machine according to claim 1, wherein the casing is made in the form of bent and welded sheet metal.

7. Processing machine according to claim 6, wherein the casing has an upper face (22) formed from sheet metal elements (20) that are appreciably flat but arranged in such a way that the upper face (22) of the casing is convex to promote the runoff of liquids to the outer part of the table (10).

8. Processing machine according to claim 1, wherein the functional elements include a container transfer wheel.

9. Processing machine according to claim 1, wherein the functional elements include a container filling carousel.

10. Processing machine according to claim 1, wherein the functional elements include a container corking carrousel.

11. Processing machine according to claim 1, wherein the functional elements include a container cleaning carrousel.

12. Processing machine according to claim 1, wherein the functional elements include legs to support the table.

13. Processing machine according to claim 1, wherein the table of the machine is formed from several juxtaposed table elements.

14. Method of producing a table for a container processing machine according to claim 2, comprising:

arranging the parts (26, 28) on a production template to fix them in place in their relative positions;

attaching the casing (18, 22) to said interface parts;

filling the casing with the material intended to form the core (17) of the sandwich structure.

* * * * *